Patented Dec. 28, 1948

2,457,117

UNITED STATES PATENT OFFICE 2,457,117

PROCESS FOR THE MANUFACTURE OF AMINO ACIDS

Dominic J. Bernardi, Bronx County, N. Y., assignor to Interchemical Corporation, a corporation of Ohio No Drawing. Application October 23, 1945, Serial No. 624,081

4 Claims. (Cl. 260—309)

My invention relates to a process for the isolation and preparation of amino acids in general and of basic amino acids in particular.

Many of the scientific achievements of the recent past in the field of nutrition became possible only after a deeper insight had been gained of the role of nitrogenous compounds in the metabolism of living organisms. It must be conceded, however, that progress was retarded too, in many instances, by the fact that specific compounds were either not available at all for experimental purposes or only in such limited quantities as to preclude extensive research. Further progress in some nutritional problems will largely depend upon an adequate and low priced supply of certain recognized basic food elements; and in this light, I consider my invention of an improved process of isolating and preparing amino acids a valuable contribution to the furtherance of science.

Proteins of different sources contain varying amounts of individual amino acids which represent the building stones of the protein molecule, and, as has been shown, though proteins of animal origin are, as a rule, well balanced nutritionally, i. e. contain the right amounts of all essential amino acids, many plant proteins are nutritionally unbalanced, mainly because of their deficiency in lysine, one of the presently recognized indispensable amino acids.

Heretofore, the preparation of lysine had been accomplished with methods which lent themselves to a preparation of only very small amounts of this amino acid. I have now discovered that lysine may be isolated from its source material and produced with good yields, in such quantities and at a price as to make it available not only for research but to make commercially feasible the use of lysine in clinical and pharmaceutical preparations and to consider its addition to bread, processed food, etc.; in short, wherever it is desired to increase the nutritional adequacy of proteinous matter that is more or less deficient in lysine.

While the average diet is less likely to show a deficiency in arginine and histidine, the importance of these amino acids in nutrition is at present subject to extensive research. My discovery makes available also these two amino acids at substantially lower costs and will thus accelerate research as to their specific functions.

There are known a number of processes for isolating and splitting off closely related groups of amino acids, as for instance the diamino or the dicarboxylic compounds, from the rest of the amino acid mixture of a protein hydrolysate, but the majority of these methods are restricted to the isolation of the groups as such, while workers in the field have devised only a small number of procedures for isolating not only groups but individual amino acids. However, all methods known to this moment have the common disadvantage of being unduly restricted in their quantitative output, thus unsuitable for even limited production levels and are, besides, tedious, complicated and expensive.

It is an object of the present invention to provide an improved process of isolating and preparing amino acids.

It is another object of the invention to provide a process of isolating and preparing unracemized and physiologically fully active amino acids.

It is another object of the invention to provide a process of isolating and preparing basic amino acids.

It is a particular object of the present invention to provide an improved process of isolating and preparing lysine, arginine and histidine, each in physiologically pure form.

Other objects of the invention will in part be obvious and will in part appear hereinafter.

The invention accordingly comprises the several steps and the relation of one or more of such steps with respect of one to each of the others, which will be exemplified in the method hereinafter disclosed and in the scope of the invention, which will be indicated in the claims.

In the practice of the invention protein matter may be hydrolyzed by means of mineral acids or enzymatic preparations or by means of combinations thereof; processes that are known to the art. The resulting hydrolysate, containing an amino acid mix that corresponds in its proportions closely to the amino acid composition of the protein that was used in the hydrolysis, after having been neutralized if such neutralization is needed and after having been freed of humic bodies, unhydrolyzed protein matter and other solids or salts as may be present, is subjected to what is known under the term ion-exchange.

While studying the rate of adsorption of amino acids on ion-exchange materials, I found not only what had been known before, namely that basic amino acids were evidently adsorbed together on natural or synthetic zeolites, but that the adsorption of histidine decreased as I raised the pH of the hydrolysate, until at a pH of about 7.5 no histidine at all was adsorbed, while the adsorption rate of lysine and arginine remained almost unaffected. Using, in subsequent experiments, so-called ion-exchange columns, I found, furthermore, that, by acidifying a hydrolysate which had passed a first column at a pH about 7.5 and given off there its lysine and arginine, to a pH below the threshold of adsorption of histidine, preferably to a pH between 5.0 and 6.0, histidine was adsorbed now selectively in a second column.

These amino acids, adsorbed on ion-exchange materials which are characterized by permitting ion-exchange in the so-called salt cycle, i. e. base exchangers which substitute one cation against another, may be eluted with any salt solution, such as sodium chloride, calcium chloride or Glauber salt. I prefer, however, elution with sodium chloride. Lysine and arginine are thus eluted together as the monohydrochlorides by a chemical displacement reaction and may be partly separated from the salt of the displacement liquid by making use of the fact that these amino acids are much more soluble in the hot than in the cold, whereas sodium chloride shows only slight variations of solubility at different temperatures. The larger part of the salt can thus be removed, without any substantial losses in lysine or arginine, by concentrating in vacuo and filtering hot from the precipitated salt. This process may be repeated, whereafter one volume of methyl or ethyl alcohol is added to the filtrate. Salt, being soluble to only a small degree in these alcohols, precipitates and is filtered from the hot solution which contains now substantially only lysine and arginine. The filtrate is then preferably refrigerated; the lowering in temperature causing lysine monohydrochloride to precipitate. The crude product, after its separation, may be washed with dilute methyl alcohol and purified by repeated recrystallizations from aqueous methyl or ethyl alcohol.

The filtrate, after removal of the lysine monohydrochloride containing substantially nothing else than arginine monohydrochloride, may be simply evaporated to dryness to give a crude, technical grade arginine monohydrochloride, or the pure amino acid may be prepared from it by precipitation with flavianic acid; a procedure known to the art. I have found, however, that, following my procedure, arginine may be precipitated with other, cheaper sulfonic acids; such as naphthalene-B-sulfonic acid or 3,4-dichlorobenzene sulfonic acid. These sulfonic acids can ordinarily not be used for the precipitation of arginine because of interference of other amino acids in mixes thereof.

It should be mentioned that my process for preparing lysine, arginine and histidine permits, as a matter of course, the removal and separation of arginine by means of flavianic acid at several stages of the process if such removal be desired; arginine may be separated as the flavianate either from the complete amino acid mix as the first separation step after the protein hydrolysis, or it may be precipitated after separation of the dicarboxylic and before adsorption of the basic amino acids if such an order of separation has been decided upon. One meritorious feature, however, brought forth in my process, is the isolation of arginine without having to resort to the use of flavianic or any other sulfonic acid; be it chosen, on the other hand, to prepare arginine by way of the sulfonic salt in the course of my process, flavianic acid may be replaced by other, cheaper sulfonic acids. Special precautions, otherwise required for the elimination of excess sulfonic acid, become unnecessary when following my procedure.

The histidine eluate may be freed from the larger part of its salt content in a similar manner as the lysine-arginine eluate. The final filtrate is again kept under refrigeration, causing histidine monohydrochloride to precipitate. This crude product can then be purified by means of repeated recrystallization, precipitation being effectuated with anhydrous methyl alcohol or with 95% ethyl alcohol.

The primary effluent from the second ion-exchange column, having been freed of lysine, arginine and histidine, contains substantially all other amino acids as were present in the original protein hydrolysate; they may subsequently be separated as groups or individually. The dicarboxylic acids, for example, may be separated as a group by means of ion-exchange processes and I have also found it practical to separate these first, previously to the separation of lysine, arginine and histidine.

The technique I employ in the separation of lysine, arginine and histidine may also become useful for extracting other monocarboxylic diamino acids of which two have been reported but not verified: citrulline and hydroxylysine. These occur in such small amounts in the common protein sources, such as blood, casein and the like, that no special attempt of isolation has been made; particularly since they were not found to interfere in the therapeutical use of the other basic amino acids. In general, while citrulline is probably destroyed during acid hydrolysis of protein matter, hydroxylysine will be separated in my process along with the lysine and arginine in the first eluate and tend to concentrate in the crystallization liquor; it will be substantially eliminated during recrystallizaton of the other basic amino acids.

As an illustrative embodiment of a manner in which the invention may be practised, the following examples are presented:

*Example I*

133 pounds of hog's blood from an abattoir, containing 18 per cent or 24 pounds of protein matter, may be hydrolyzed under refluxing with 63 pounds of 98 per cent sulfuric acid, diluting the acid, if necessary, beforehand so that the initial sulfuric acid concentration is about 24 per cent by volume or 35 per cent by weight. I have found it somewhat more advantageous, however, to coagulate and to separate the protein from the other blood constituents previously to the hydrolysis by introducing live steam into the blood, keeping the same at a temperature of 95° C. for 30 minutes and by separating and washing the thus obtained protein coagulate. After 16 hours of refluxing, the aforementioned hydrolysis mix is diluted with an equal volume of water and brought to a pH of about 9.0 by means of adding 18 gallons of lime slurry, containing approximately 50 pounds of slaked lime. For the removal of calcium sulfate, which forms upon addition of the lime, I prefer the use of a filter press. Thorough washing of the filter cake, to obtain as much as possible of the extract, is achieved by following the filtrate with hot water, said operation resulting in a total of 86 gallons of process solution of an extract concentration of approximately three per cent. I prefer, at this point, to concentrate in vacuo to about eight to nine per cent extract, thus reducing the volume of the process solution to close to 30 gallons and incidentally removing, during this vacuum concentration, any ammonia that may have formed as a result of the preceding acid hydrolysis.

I have found it also advisable to remove, by either filtration or by means of a centrifugal, small amounts of calcium sulfate which precipitate consequent to the vacuum concentration. Calcium and sulfate ions, that remain in solution, may be eliminated after careful addition of molar equivalents of oxalic acid and barium hydroxide, where after the extract is submitted to an ion-exchange process, which I prefer to carry out with the aid of ion-exchange columns, filled with a natural or synthetic ion-exchange material which is distinguished by reacting in the so-called salt cycle. Ion-exchange material, sold under the trade name "Decalso," is a suitable product for these specific purposes.

After having adjusted the extract to alkalinity of a pH from 7.5 to 8.0, it is pumped, preferably at a rate of about 24 gallons per hour, through a column, containing a sufficiently large amount of the prepared ion-exchange material; 60 pounds of the aforementioned "Decalso" allow for an adequately safety margin in the adsorption of substantially all the lysine and arginine contained in the hydrolysate.

The effluent, leaving the lysine-arginine adsorption column while the hydrolysate is fed into said column, may be recycled or the operation may be carried out by means of two or a relay of several columns; it is then collected and used in the separation of histidine; as will be described in detail farther below.

Having finished the adsorption cycle, the lysine-arginine assembly is preferably rinsed until the outflow proves to be free of amino acids. Following this rinse, lysine and arginine are eluted by means of any mineral salt solution having a pH of 6.0 to 8.5. I use a five per cent sodium chloride brine and prefer to pump through the column 35 gallons of said brine at a rate of approximately 0.6 gallon per minute. The eluate, containing lysine-and-arginine monohydrochloride, is freed of the larger part of its sodium chloride by alternately concentrating in vacuo and removing crystallized sodium chloride from the hot solution. Having reduced, in this manner, the volume of the concentrate to one gallon or less, an equal volume of methyl alcohol is added and salt, which crystallizes upon this addition, is removed, once more, after having heated the extract. Refrigeration overnight, preferably under mechanical stirring, causes lysine monohydrochloride to crystallize; it is separated from the solution and washed with methyl alcohol. The filtrate may be concentrated again; it will produce, upon renewed addition of methyl alcohol and after refrigeration, another small amount of crystalline lysine monohydrochloride.

The combined crude product yields, after several recrystallizations from aqueous methyl alcohol, a minimal amount of one pound analytically pure 1 (+) lysine monohydrochloride.

Having removed the lysine from the above concentrate, the latter, containing at this stage substantially only arginine monohydrochloride, is evaporated to dryness, yielding approximately 0.6 pound of this amino acid in its crude, technical form.

The effluent from the aforementioned first ion-exchange assembly, containing substantially all amino acids of the original protein hydrolysate except lysine and arginine, is now acidified to a pH of about 6.0 and sent through a second column or arrangement of columns filled with identical ion-exchange material which, however, requires "activation" to serve as an efficient adsorbent for histidine. Activation is accomplished by passing a preferably two per cent acetic acid solution through this ion-exchange material.

To eluate histidine I use again 35 gallons of a five per cent sodium chloride solution and I also prefer to keep the feeding rates of adsorption and elution of histidine within the same range as those used in connection with the separation of lysine-arginine.

The histidine eluate is freed of the larger part of its sodium chloride in the same manner as the lysine-arginine eluate; by alternately concentrating in vacuo and removing crystallized salt from the hot solution. After having thus reduced the volume of the concentrate to one gallon and less, it is refrigerated overnight after adding first a small volume of distilled water to compensate for the slightly decreased solubility of sodium chloride in the cold and crystalline histidine monohydrochloride is separated from the solution in the morning. This procedure may be repeated three or four times; each time yielding successively smaller amounts of the amino acid.

The combined crude histidine is purified by means of several recrystallizations, precipitation being effectuated by adding methanol or 95 per cent ethanol. A minimum yield of 0.6 pound analytically pure 1 (—) histidine monohydrochloride is obtained.

*Example II*

In the previous example, of the three amino acids; lysine, arginine and histidine that were separated, lysine and histidine were obtained in their chemically pure form, while only crude, technical grade arginine is produced by evaporating to dryness the concentrated eluate of the first ion-exchange column which previously had been freed of sodium chloride and lysine monohydrochloride. Should particular emphasis be placed upon the preparation of chemically pure arginine, I prefer, as a starting material, the use of wheat germ protein which had been freed of the fatty, carbohydrate and other constituents of wheat germ previously to the hydrolysis; this type of protein being approximately 25% higher in arginine than blood protein. By using 24 pounds of wheat germ protein and following a procedure, similar to the one given in the first example and to a point where the concentrated eluate contains substantially only arginine, this amino acid may be obtained in its analytically pure state and with good yield by way of precipitating arginine as monosulfonate with one of the group of sulfonic acids which react with amino acids. I found, for example, naphthalene-B-sulfonic acid or 3,4-dichloro-benzene sulfonic acid to be suitable for these purposes. Adding a hot solution of about 1500 grams of one of said sulfonic acids in one gallon of water to the concentrate, boiling the reaction mix for three minutes, followed by refrigeration overnight, precipitates arginine sulfonate which is separated and washed the following morning.

The preparation of arginine monohydrochloride from the sulfonate is carried out according to accepted procedures. A minimum yield of 0.8 pound of analytically pure 1 (+) arginine monohydrochloride is obtained.

Lysine and histidine may be separated and purified in conjunction with the production of analytically pure arginine in the same manner that has been set forth in Example I. However, in view of the differences in proportions of the various amino acid constituents of different proteins, the separation of lysine and histidine from wheat germ protein results in lower yields than their preparation from blood protein; the average yield being 0.7 pound and 0.3 pound respectively from 24 pounds of wheat germ protein and after repeated recrystallizations to obtain analytically pure products.

*Example III*

24 pounds of casein are hydrolyzed, under refluxing and for about 16 hours, with hydrochloric acid having a concentration of 20 percent by weight of the liquid part of the hydrolysis mix at the beginning of the operation. The extract, after being separated from solids remaining after or having formed during the hydrolysis, is concentrated in vacuo to syrupy consistency while simultaneously being freed of substantially all the hydrochloric acid. Following this vacuum concentration, the residual syrup is rediluted to an extract concentration of about eight to ten per cent and hereafter subjected to a deacidification process, which I prefer to carry out with the aid of columns, filled with an acid adsorbing material. A product, sold under the trade name "De-Acidite," has been found suitable for these specific purposes. The extract is freed, by this process, of its dicarboxylic monoamino acids, viz. aspartic and glutamic acid and may incidentally be freed of any free hydrochloric acid that was not evaporated during the concentration in vacuo.

These dicarboxylic monoamino acids may be eluted and separated from the adsorbent material by means of dilute caustic soda or sodium carbonate solution, procedures known to the art.

The first effluent from the acid adsorption assembly, containing substantially all amino acids present in the hydrolysate except the dicarboxylic monoamino compounds, may now be used advantageously for separating lysine, arginine and histidine as set forth in Examples I and II. Yields of diamino acids from casein hydrolysate are substantially of the same order as those from hydrolyzed blood protein.

*Example IV*

22 pounds of blood protein are separated and hydrolyzed as illustrated in Example I and the arginine is removed with excess flavianic acid after clarification and vacuum concentration of the hydrolysate to an extract content of eight to ten per cent. Having freed the latter of excess flavianic acid by means of baryta and surplus baryta removed with sulfuric acid, the pH is adjusted to about 8.0 before passing the hydrolysate through an ion-exchange column, similar to the ones described in Example I, which, however, had been converted to the calcium form previously to the run; this by passing through a five per cent solution of calcium chloride, followed by a rinse until the outflow proves to be free of calcium chloride.

During the adsorption process, lysine, retained in the column, is exchanged for calcium ion which permits its complete and easy removal from the effluent by means of oxalic acid. The hydrolysate is thus freed of arginine and lysine without the introduction of an ion such as Na+ which can be removed only with difficulty.

After rinsing the column to eliminate all other amino acids, lysine is eluted with 25 gallons of a five per cent calcium chloride solution. The eluate is concentrated in vacuo to approximately 1.8 gallons and then refrigerated overnight. Precipitated calcium chloride is separated next morning and the filtrate concentrated further until the volume has been reduced to about 0.26 gallon and the extract has become of a syrupy consistency. After adding twice the volume of methanol, the mixture is heated in boiling water and kept for 15 minutes at a temperature of about 95° C., then filtered hot from a small amount of precipitate whereafter the filtrate is again refrigerated for several hours. Lysine monohydrochloride, which precipitates thereupon, is separated and yields, after repeated recrystallization from aqueous methyl alcohol, 0.2 pound of the analytically pure product.

Since certain changes may be made in carrying out the above processes without departing from the scope of the invention, it is intended that all matter contained in the above description shall be interpreted as illustrative and not in a limiting sense.

It is also to be understood that the following claims are intended to cover all of the generic and specific features herein described, and all statements of the scope of the invention which, as a matter of language might be said to fall there between.

I claim:

1. In the process of separating histidine from hydrolyzed protein containing histidine, lysine, arginine, and other amino acids, the steps which comprise adjusting the pH value of the hydrolysate to about 8, passing the hydrolysate in contact with a body of loose, particulate ion-exchange material which operates in the salt cycle whereby the lysine and arginine of the hydrolysate are retained in said ion-exchange material while the other amino acids are contained in the effluent, adjusting the pH of the effluent to about 6 and passing it in contact with a second body of loose, particulate ion-exchange material operating in the salt cycle whereby the histidine which was contained in the first effluent is retained in this second body of ion-exchange material and the remaining amino acids contained in the first effluent are contained in the effluent from the second ion-exchange material, and washing this second ion-exchange material with a dilute salt solution to eluate the histidine in the washing liquid so that it may be recovered therefrom separately from the other amino acids.

2. In the process of separating lysine and arginine from hydrolyzed protein which contains them and other amino acids, the steps which comprise adjusting the pH value of the hydrolysate to about 8, passing said hydrolysate in contact with a body of loose, particulate ion-exchange material which operates in the salt cycle whereby the lysine and arginine of the hydrolysate are retained in said ion-exchange material while the remaining amino acids of the hydrolysate are in the effluent, and washing said ion-exchange material with a dilute salt solution to eluate the lysine and arginine in the washing liquid whereby they may be recovered separately from the other amino acids which were contained in the hydrolysate.

3. In the process of separating histidine from an acid hydrolyzed protein containing histidine, lysine, arginine, and other amino acids, the steps which comprise freeing the hydrolysate from ammonia, adjusting the pH value to about 8, passing the hydrolysate in contact with a body of loose, particulate ion-exchange material which operates in the salt cycle whereby the lysine and arginine of the hydrolysate are retained in said ion-exchange material while the other amino acids are contained in the effluent, adjusting the pH of the effluent to about 6 and passing it in contact with a second body of loose, particulate ion-exchange material operating in the salt cycle whereby the histidine which was contained in the first effluent is retained in this second body of ion-exchange material and the remaining amino acids contained in the first effluent are contained in the effluent from the second ion-exchange material, and washing this second ion-exchange material with a dilute salt solution to eluate the histidine in the washing liquid so that it may be recovered therefrom separately from the other amino acids.

4. In the process of separating lysine and arginine from an acid hydrolyzed protein which contains them and other amino acids, the steps which comprise freeing the hydrolysate from ammonia, adjusting the pH value to about 8, passing said hydrolysate in contact with a body of loose, particulate ion-exchange material which operates in the salt cycle whereby the lysine and arginine of the hydrolysate are retained in said ion-exchange material while the remaining amino acids of the hydrolysate are in the effluent, and washing said ion-exchange material with a dilute salt solution to eluate the lysine and arginine in the washing liquid whereby they may be recovered separately from the other amino acids which were contained in the hydrolysate.

DOMINIC J. BERNARDI.

REFERENCES CITED

The following references are of record in the file of this patent:

UNITED STATES PATENTS

| Number | Name | Date |
| --- | --- | --- |
| 1,602,958 | Woo | Oct. 12, 1926 |
| 2,214,115 | Bishop et al. | Sept. 10, 1940 |
| 2,328,940 | Alderson et al. | Sept. 7, 1943 |
| 2,375,164 | Bennet | May 1, 1945 |
| 2,375,165 | Nees et al. | May 1, 1945 |
| 2,386,926 | Block | Oct. 16, 1945 |
| 2,387,824 | Block | Oct. 30, 1945 |

FOREIGN PATENTS

| Number | Country | Date |
| --- | --- | --- |
| 805,092 | France | Nov. 10, 1936 |

OTHER REFERENCES

Gatterman, Practical Methods of Org. Chem. (3rd ed. Macmillan, 1923) pp. 1-14.

Mitchell et al., "Biochem of Amino Acids," ACS Monographs #48, (1929), pp. 169-170.

Griessbach, Richter, Chem. Abstracts, volume 33, column 8417 (1939).

Frendenberg et al., Naturwissenschaften, volume 30, page 87 (1942).